(12) United States Patent
Andreasen et al.

(10) Patent No.: US 8,050,391 B1
(45) Date of Patent: Nov. 1, 2011

(54) SYSTEM AND METHOD FOR CAPTURING ACCOUNTING DATA FOR A COMMUNICATION SESSION

(75) Inventors: Flemming S. Andreasen, Marlboro, NJ (US); Jonathan D. Rosenberg, Freehold, NJ (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 11/715,018

(22) Filed: Mar. 6, 2007

Related U.S. Application Data

(60) Provisional application No. 60/780,176, filed on Mar. 6, 2006.

(51) Int. Cl.
*H04M 11/00* (2006.01)

(52) U.S. Cl. .................................. 379/90.01; 370/261

(58) Field of Classification Search .................. 370/261, 370/467, 265.09, 229, 349; 709/223
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amauh | 709/231 |
| 6,339,832 B1 | 1/2002 | Bowman-Amauh | 714/35 |
| 6,434,568 B1 | 8/2002 | Bowman-Amauh | 707/103 R |

(Continued)

FOREIGN PATENT DOCUMENTS

WO WO 98/26381 6/1998

(Continued)

OTHER PUBLICATIONS

Draft—TR45—PN-3-4732-RV4 (to be published as TIA-835.1-D), 32 pages.
Draft—TR45—PN-3-4732-RV4 (to be published as TIA-835.2-D), 93 pages.
Draft—TR45—PN-3-4732-RV4 (to be published as TIA-835.3-D), 36 pages.
Draft—TR45—PN-3-4732-RV4 (to be published as TIA-835.4-D), 70 pages.
Draft—TR45—PN-3-4732-RV4 (to be published as TIA-835.5-D), 72 pages.

(Continued)

*Primary Examiner* — Curtis Kuntz
*Assistant Examiner* — Maria El-Zoobi
(74) *Attorney, Agent, or Firm* — Baker Botts L.L.P.

(57) ABSTRACT

A method for creating an accounting record in a communication network may include receiving a SIP message and matching service point triggers with data. The method may also include invoking an application server associated with the service point trigger matched. The method also includes capturing accounting information associated with the invoked application server.

20 Claims, 3 Drawing Sheets

U.S. PATENT DOCUMENTS

| | | | |
|---|---|---|---|
| 6,434,628 B1 | 8/2002 | Bowman-Amauh | 714/48 |
| 6,438,594 B1 | 8/2002 | Bowman-Amauh | 709/225 |
| 6,442,748 B1 | 8/2002 | Bowman-Amauh | 717/108 |
| 6,466,964 B1 | 10/2002 | Leung et al. | 709/202 |
| 6,477,580 B1 | 11/2002 | Bowman-Amauh | 709/231 |
| 6,477,665 B1 | 11/2002 | Bowman-Amauh | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amauh | 709/203 |
| 6,502,213 B1 | 12/2002 | Bowman-Amauh | 714/49 |
| 6,510,513 B1 | 1/2003 | Danieli | 713/156 |
| 6,529,909 B1 | 3/2003 | Bowman-Amauh | 707/10 |
| 6,529,948 B1 | 3/2003 | Bowman-Amauh | 709/217 |
| 6,539,396 B1 | 3/2003 | Bowman-Amauh | 707/103 R |
| 6,549,949 B1 | 4/2003 | Bowman-Amauh | 709/236 |
| 6,550,057 B1 | 4/2003 | Bowman-Amauh | 717/126 |
| 6,571,282 B1 | 5/2003 | Bowman-Amauh | 709/219 |
| 6,578,068 B1 | 6/2003 | Bowman-Amauh | 709/203 |
| 6,601,192 B1 | 7/2003 | Bowman-Amauh | 714/38 |
| 6,601,234 B1 | 7/2003 | Bowman-Amauh | 717/108 |
| 6,606,660 B1 | 8/2003 | Bowman-Amauh | 709/227 |
| 6,611,821 B2 | 8/2003 | Stahl et al. | 705/400 |
| 6,615,199 B1 | 9/2003 | Bowman-Amauh | 706/50 |
| 6,615,253 B1 | 9/2003 | Bowman-Amauh | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amauh | 715/764 |
| 6,640,238 B1 | 10/2003 | Bowman-Amauh | 709/201 |
| 6,640,244 B1 | 10/2003 | Bowman-Amauh | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amauh | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amauh | 718/101 |
| 6,742,036 B1 | 5/2004 | Das et al. | 709/226 |
| 6,757,371 B2 | 6/2004 | Kim et al. | 379/114.22 |
| 6,760,417 B1 * | 7/2004 | Wallenius | 379/114.28 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amauh | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 * | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Paranteinen et al. | 370/231 |
| 7,058,165 B2 | 6/2006 | Koskinen et al. | 379/115.03 |
| 7,079,499 B1 | 7/2006 | Akhtar et al. | 370/310 |
| 7,082,301 B2 | 7/2006 | Jagadeesan et al. | 455/436 |
| 7,103,351 B2 | 9/2006 | Chaudhari et al. | 455/414.1 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,145,994 B2 | 12/2006 | Moreau et al. | 379/114.01 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et al. | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0072333 A1 | 6/2002 | Gnesda et al. | 455/67.1 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Rosemarijn Bos et al. | 455/452 |
| 2002/0176377 A1 | 11/2002 | Hamilton | 370/328 |
| 2002/0188712 A1 * | 12/2002 | Caslin et al. | 709/223 |
| 2003/0004950 A1 | 1/2003 | Wils et al. | 707/10 |
| 2003/0021252 A1 | 1/2003 | Harper et al. | 370/338 |
| 2003/0039237 A1 | 2/2003 | Forslow | 370/352 |
| 2003/0054795 A1 | 3/2003 | Tamaki et al. | |
| 2003/0058839 A1 * | 3/2003 | D'Souza | 370/352 |
| 2003/0060188 A1 | 3/2003 | Gidron et al. | |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0047339 A1 * | 3/2004 | Wang et al. | 370/352 |
| 2004/0101117 A1 | 5/2004 | Koskinen et al. | 379/126 |
| 2004/0107241 A1 | 6/2004 | Jayapalan et al. | |
| 2004/0114553 A1 | 6/2004 | Jiang et al. | 370/328 |
| 2004/0142679 A1 | 7/2004 | Kearns et al. | |
| 2004/0162876 A1 | 8/2004 | Kohavi | 709/203 |
| 2004/0162892 A1 | 8/2004 | Hsu | 709/221 |
| 2004/0196821 A1 * | 10/2004 | Haddad et al. | 370/349 |
| 2004/0210524 A1 | 10/2004 | Benenati et al. | 705/40 |
| 2004/0259562 A1 | 12/2004 | Madour | 455/452.2 |
| 2005/0002242 A1 * | 1/2005 | O'Neill et al. | 365/199 |
| 2005/0002407 A1 * | 1/2005 | Shaheen et al. | 370/401 |
| 2005/0009499 A1 | 1/2005 | Koster | |
| 2005/0025132 A1 | 2/2005 | Harper et al. | 370/352 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0191989 A1 | 9/2005 | Plush et al. | |
| 2005/0195766 A1 | 9/2005 | Nasieiski et al. | 370/331 |
| 2005/0201324 A1 | 9/2005 | Zheng | 370/331 |
| 2005/0213606 A1 * | 9/2005 | Huang et al. | 370/467 |
| 2005/0220039 A1 * | 10/2005 | Hoshino et al. | 370/261 |
| 2005/0278420 A1 | 12/2005 | Hartikainen et al. | 709/203 |
| 2005/0286709 A1 * | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0077924 A1 | 4/2006 | Rune | 370/328 |

| | | | | |
|---|---|---|---|---|
| 2006/0116113 | A1 | 6/2006 | Gass | 455/414.4 |
| 2006/0126630 | A1 | 6/2006 | Shirazipour et al. | 370/392 |
| 2006/0171310 | A1* | 8/2006 | Ahluwalia et al. | 370/229 |
| 2006/0251038 | A1 | 11/2006 | Tamura et al. | 370/342 |
| 2006/0264207 | A1 | 11/2006 | Tamura et al. | 455/415 |
| 2006/0268819 | A1 | 11/2006 | Chen et al. | 370/349 |
| 2007/0008882 | A1 | 1/2007 | Oran | 370/229 |
| 2007/0036312 | A1 | 2/2007 | Cai et al. | 379/126 |
| 2007/0086582 | A1 | 4/2007 | Tai et al. | 379/114.01 |
| 2007/0094712 | A1 | 4/2007 | Gibbs et al. | 726/3 |
| 2007/0121615 | A1 | 5/2007 | Weill et al. | 370/389 |
| 2007/0121642 | A1 | 5/2007 | Battin et al. | 370/395.2 |
| 2007/0153720 | A1 | 7/2007 | Baglin et al. | 370/328 |
| 2007/0213031 | A1 | 9/2007 | Ejzak et al. | 455/406 |
| 2007/0220553 | A1* | 9/2007 | Branam et al. | 725/46 |
| 2007/0254661 | A1 | 11/2007 | Chowdhury et al. | 455/436 |
| 2008/0311884 | A1 | 12/2008 | Ala-Laurila et al. | 455/406 |

FOREIGN PATENT DOCUMENTS

| | | |
|---|---|---|
| WO | WO 99/31610 | 6/1999 |
| WO | WO 2005/107297 | 11/2005 |

OTHER PUBLICATIONS

Draft—TR45—PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 127 pages, Mar. 2006.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.
3GPP2 C.S0024-A, 3rd Generation Partnership Project 2 '3GPP2', "cdma2000 High Rate Packet Data Air Interface Specification," Version 2.0, 1,223 pages, Jul. 2005.
B. Aboba, et al., "Extensible Authentication Protocol (EAP)," Network Working Group, RFC 3748, http://www.ietf.org/rfc/rfc3748.txt, 59 pages, Jun. 2004.
B. Aboba, D. Simon, "PPP EAP TLS Authentication Protocol," Network Working Group, RFC 2716, http://www.ietf.org/rfc/rfc2716.txt, 22 pages, Oct. 1999.
W. Simpson, "PPP Challenge Handshake Authentication Protocol (CHAP)," Network Working Group, RFC 1994, http://www.ietf.org/rfc/rfc1994.txt, 12 pages, Aug. 1996.
W. Simpson, "The Point-to-Point (PPP)," Network Working Group, RFC 1661, http://www.ietf.org/rfc/rfc1661.txt, 47 pages, Jul. 1994.
P. Eronen, et al., "Diameter Extensible Authentication Protocol (EAP) Application," Network Working Group, RFC 4072, http://www.ietf.org/rfc/rfc4072.txt, 29 pages, Aug. 2005.
P. Calhoun, et al., "Diameter Base Protocol," Network Working Group, RFC 3588, http://www.ietf.org/rfc/rfc3588.txt, 129 pages, Sep. 2003.
3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages.
PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Access Authentication in a Mobile Wireless Network," U.S. Appl. No. 11/419,382, 20 pps, 3 pps drawings, (2104), filed May 19, 2006.
Yegani et al., "System and Method for Handover of an Access Terminal in a Communication Network," U.S. Appl. No. 11/682,735, 24 pps, 3 pps drawings (2360), filed Mar. 6, 2007.
Yegani et al., "Enforcement of User Level Policies from Visited Networks in a Mobile IP Environment," U.S. Appl. No. 11/682,817, 22 pps, 2 pps drawings (2359), filed Mar. 6, 2007.
Yegani et al, Authentication of Access Terminals in a Cellular Communication Network,: U.S. Appl. No. 11/682,857, 28 pps, 5 pps drawings (2358), filed Mar. 6, 2007.
Andreasen et al., "System and Method of Consolidating Accounting Data for a Communication Session," U.S. Appl. No. 11/714,974, 40 pps, 3 pps drawings, (2404), filed Mar. 6, 2007.
Rosenberg et al., "System and Method for Determining a Network for Processing Applications for a Communication Session," U.S. Appl. No. 11/715,019, 40 pps, 3 pps drawings, (2406), filed Mar. 6, 2007.
Rosenberg et al., "Determining a Policy Output for a Communication Session," U.S. Appl. No. 11/715,032, 31 pps, 4 pps drawings, (2368), filed Mar. 6, 2007.
Leung et al., "Communicating Packets Using a Home Anchored Bearer Path," U.S. Appl. No. 11/715,033, 33 pps, 4 pps drawings, (2407), filed Mar. 6, 2007.
Andreasen et al., "Posture-Based Network Authentication," U.S. Appl. No. 11/715,040, 23 pages, 2 pps drawings, (2398), filed Mar. 6, 2007.
Iyer et al., "Access Terminal for Communicating Packets Using a Home Anchored Bearer Path," U.S. Appl. No. 11/715,041, 33 pps, 4 pps drawings, (2300), filed Mar. 6, 2007.
Rosenberg et al., "System and Method for Exchanging Policy Information in a Roaming Communications Environment,"U.S. Appl. No. 11/715,056, 42 pps, 3 pps drawings, (2416), filed Mar. 6, 2007.
Rosenberg et al., "Establishing Facets of a Policy for a Communication Session," U.S. Appl. No. 11/715,065, 32 pps, 4 pps drawings, (2409), filed Mar. 6, 2007.
Rosenberg et al., "Performing Deep Packet Inspection for a Communication Session," U.S. Appl. No. 11/715,073, 31 pps, 4 pps drawings, (2400), filed Mar. 6, 2007.
Rosenberg et al., "Assigning a Serving- CSCF During Access Authentication," U.S. Appl. No. 11/715,074, 22 pps, 2 pps drawings, (2410), filed Mar. 6, 2007.
Rosenberg et al., "System and Method for Providing Emergency Services in a Visited Communications Environment," U.S. Appl. No. 11/715,111, 39 pps, 2 pps drawings, (2418), filed Mar. 6, 2007.
Panda et al., "Application-Aware Policy Enforcement," U.S. Appl. No. 11/715,187, 28 pps, 2 pps drawings, (2403), filed Mar. 6, 2007.
Andreasen et al., "System and Method for Generating a Unified Accounting Record for a Communication Session," U.S. Appl. No. 11/715,210, 46 pps, 3 pps drawings, (2399), filed Mar. 6, 2007.
Andreasen et al., "Network-triggered quality of service (QoS) Reservation," U.S. Appl. No. 11/715,250, 21 pps, 2 pps drawings, (2405), filed Mar. 6, 2007.
Andreasen et al.,; "Policy-Based Control of Content Intercept", U.S. Appl. No. 11/715,251, 23 pps, 2 pps drawings, (2401).
Rosenberg et al., "System and Method for Network Charging Using Policy Peering," U.S. Appl. No. 11/715,256, 43 pps, 3 pps drawings, (2415), filed Mar. 6, 2007.
Online Inc., "Apogee Releases Content Usage-Based Billing Product Annotated Title—Software allows content usage-based billing," EContent, vol. 24, No. 5, NDN 173-0356-6509-7, 1 pg., Jul. 2001.
Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.
Karsten Lüttge, "E-Charging API: Outsource Charging to a Payment Service Provider," NDN 174-0708-0924-8, pp. 216-227, 2001.
A. Herzberg, "Safeguarding Digital Library Contents: Charging for Online Content," D-Lib Magazine, NDN 174-0590-9051-8, 16 pgs., Jan. 1998.
Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISC04-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US2006/046800, (10 pgs), Nov. 10, 2008.

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISC04-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.

*United States Patent and Trademark Office, Office Action* for U.S. Appl. No. 11/714,974, filed Mar. 6, 2007 in the name of Andreasen et al., (9 pgs), Notification Date Mar. 20, 2009.

*United States Patent and Trademark Office, Office Action* for U.S. Appl. No. 11/715,210, filed Mar. 6, 2007 in the name of Andreasen et al., (7 pgs), Notification Date Mar. 23, 2009.

United States Patent and Trademark Office, Office Action for U.S. Appl. No. 11/714,974, filed Mar. 6, 2007 in the name of Andreasen et al., (12 pgs), Notification Date Oct. 21, 2009.

US Patent and Trademark Office, Notice of Allowance and Fee (s) Due/Notice of Allowability for U.S. Appl. No. 11/715,210, Filed Mar. 6, 2007, Inventor Flemming S. Andreasen, 10 pages, Mailing Date Nov. 10, 2009.

United States Patent and Trademark Office, Office Action for U.S. Appl. No. 11/715,018, filed Mar. 6, 2007 in the name of Andreasen et al., (10 pgs), Notification Date Mar. 12, 2009.

United States Patent and Trademark Office, Office Action for U.S. Appl. No. 11/715,210, filed Mar. 6, 2007 in the name of Andreasen et al., (7 pgs), Notification Date Mar. 23, 2009.

3GPP TS 32.299 V7.3.0 (Sep. 2006), 3rd Generation Partnership Project; Technical Specification Group Service and System Aspects; Telecommunication Management; Charging Management; Diameter Charging Applications (Release 7), 101 pages.

United States Patent and Trademark Office, Office Action for U.S. Appl. No. 11/714,974, filed Mar. 6, 2007 in the name of Andreasen et al., (13 pgs), Notification Date Mar. 22, 2010.

United States Patent and Trademark Office, Notice of Allowance and Fee(s) Due/Notice of Allowability for U.S. Appl. No. 11/715,210, filed Mar. 6, 2007, Inventor Flemming S. Andreasen, 7 pages, Notification Date Mar. 18, 2010.

3GPP TS 32.260 V7.0.0 (Sep. 2006), 3rd Generation Partnership Project; Technical Specification Group Service and System Aspects; Telecommunication Management; Charging Management; IP Multimedia Subsystem (IMS) charging (Release 7), 22 pages, 2006.

PacketCable™ Specification; Multimedia Specification; PKT-SP-MM-103-051221; Issued, 149 pages, Dec. 2005.

Andreasen et al., U.S. Appl. No. 11/714,974, USPTO Office Action filed Dec. 10, 2010 8 pages.

Andreasen et al., U.S. Appl. No. 11/714,974, USPTO Office Action filed Jun. 28, 2010 12 pages.

United States Patent and Trademark Office, Office Action for U.S. Appl. No. 11/714,974, filed Mar. 6, 2007 in the name of Andreasen et al., Mar. 22, 2010.

United States Patent and Trademark Office, Notice of Allowance and Fee(s) Due/Notice of Allwability for U.S. Appl. No. 11/715,210, filed Mar. 6, 2007, Inventor Flemming S. Andreasen, Notification Date Mar. 18, 2010.

3GPP TS 32.260 V7.0.0 (Sep. 2006), 3rd Generation Partnership Project; Technical Specification Group Service and System Aspects; Telecommunication Management; Charging Management; IP Multimedia Subsystem (IMS) charging (Release 7), 2006.

PacketCable™ Specification; Multimedia Specification; PKT-SP-MM-103-051221; Dec. 2005.

* cited by examiner

SYSTEM AND METHOD FOR CAPTURING ACCOUNTING DATA FOR A COMMUNICATION SESSION

RELATED APPLICATION

This application claims benefit under 35 U.S.C. § 119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT,", filed Mar. 6, 2006, by Flemming Andreasen et al., which is incorporated herein by reference.

TECHNICAL FIELD

This invention relates generally to the field of telecommunications and, more particularly, to accounting data for a communication session.

BACKGROUND OF THE INVENTION

An endpoint, such as an access terminal, may use a system of communication networks to communicate packets with other endpoints during communication sessions. For example, an access terminal may subscribe to a network that maintains subscription information for the access terminal.

Certain known techniques may be used to make accounting records for these communication sessions.

These known techniques, however, are not efficient in certain situations. In certain situations, it is generally desirable to be efficient.

SUMMARY OF THE INVENTION

In accordance with the present invention, disadvantages and problems associated with previous techniques for creating accounting records may be reduced or eliminated.

In accordance with one embodiment of the present invention, a method for creating an accounting record in a communication network includes receiving a SIP message and matching service point triggers with data. The method also includes invoking an application server associated with the service point trigger matched. The method also includes capturing accounting information associated with the invoked application server.

In accordance with another embodiment of the present invention, the method for creating an accounting record in a communication network includes consolidating accounting information into the accounting record. The method also includes sending the accounting record to a services data manager.

Important technical advantages of certain embodiments of the present invention include capturing accounting data with an element, such as an application manager, rather than application servers. Application servers do not require an accounting interface if the application servers are only invoked without having to capture the accounting data. As a result, the development and deployment of application servers are simplified since there is no need to support a new accounting feed from a new element. Instead, additional accounting data can be provided by an existing element that has already been tested, such as the application manager.

Other important technical advantages of certain embodiments of the present invention include simplifying backend billing processing by having all accounting data associated with a session (such as a SIP session) being included in the same Rf accounting session. In the old scheme, when the application server provided the accounting data, the backend billing system has to not only look for these additional records (additional processing), but the billing system has to also be updated to look for those records when new application servers are introduced. Since different users may invoke different services, this can be very complex.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
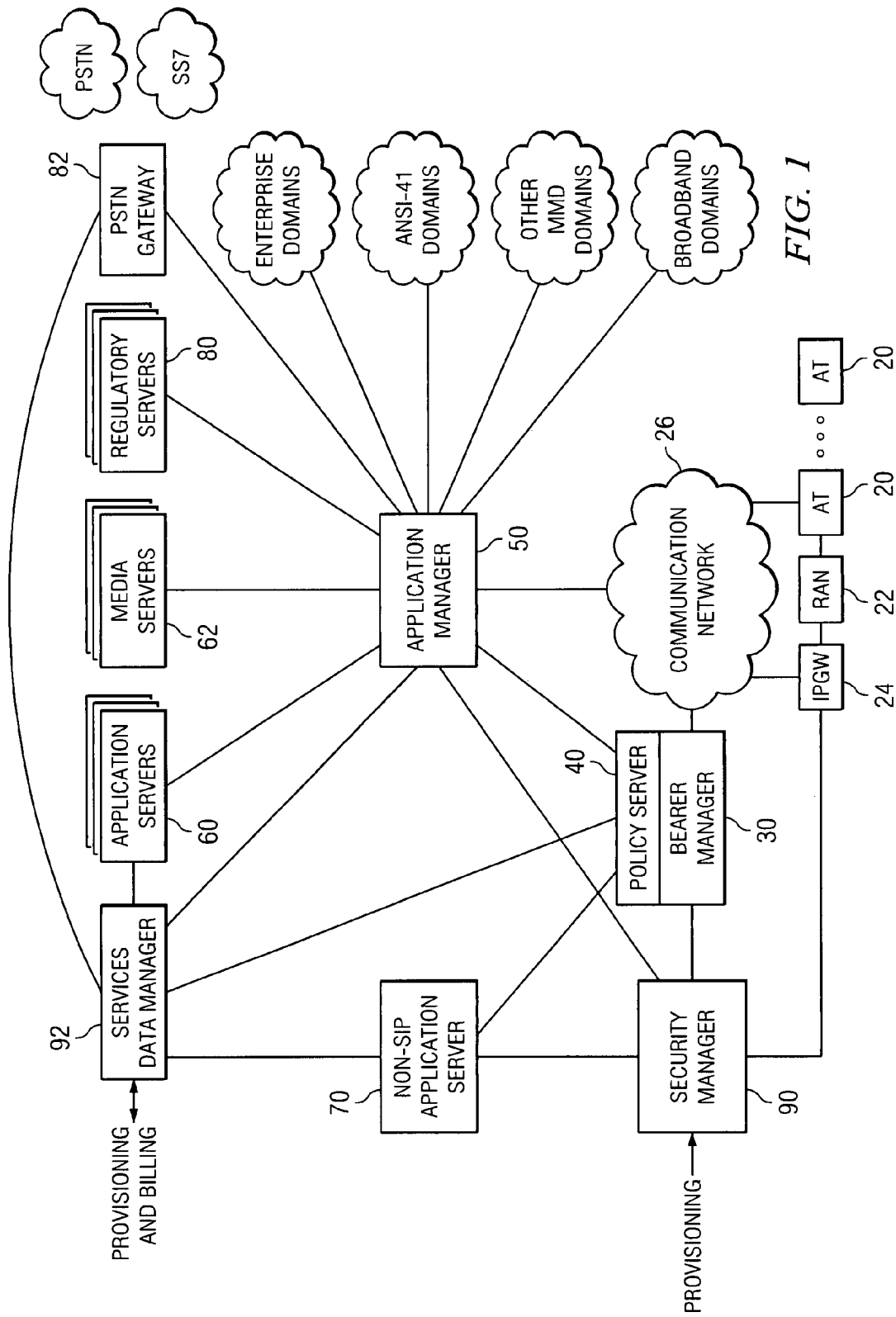
FIG. 1 is a simplified block diagram that illustrates a system that communicates packets for an access terminal in accordance with an embodiment of the present invention.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

In one embodiment of the present invention, capturing accounting data in an all-IP next generation network architecture is implemented. The network architecture includes an application manager, which is at least responsible for providing SIP services to its assigned users. The application manager can invoke one or more external application servers in order to do so by use of the SIP-based ISC interface.

When users receive SIP service, it is important to capture accounting information for the SIP service provided. This enables the service provider to charge the user for the service, manage and troubleshoot the service, and even provide other services (for example, provide a list of called numbers). In existing architectures, such accounting information can be provided via the DIAMETER-based Rf interface, which can be used by the application manager as well as the external application servers 60. Diameter is a peer-to-peer protocol that involves delivering attribute-value pairs (AVPs). A Diameter message includes a header and one or more AVPs. The collection of AVPs in each message is determined by the type of Diameter application, and the Diameter protocol also allows for extension by adding new commands and AVPs. Diameter enables multiple peers to negotiate their capabilities with one another, and defines rules for session handling and accounting functions.

In existing architectures, the Rf interface allows the application manager to identify the SIP application servers 60 invoked over the ISC interface by use of the Application-Server-Information AVP, which contains one or more SIP URL's of the application servers addressed during the session. However, existing architectures do not allow for any additional accounting information, such as time of invocation, application specific parameters, to be captured in a dynamic and structured manner.

The use of external application servers in the network architecture is in part motivated by the need to easily introduce new services. This implies a modular and general approach to not only the service logic but also the associated accounting logic and integration. Rapid and cost-effective service introduction suffers if introduction of a new application server requires that the application server must produce its own accounting data, the application server need to send that accounting data to an accounting entity, and the accounting entity has to be updated to act on that new accounting data.

In the existing Rf-based accounting interface, application servers can either send their own accounting data, or the application manager can provide information about the application servers 60 that were invoked by use of the Application-Server-Information AVP, which captures only the SIP URL's of the application servers addressed during the session. The former suffers from the drawbacks identified above, whereas the latter provides insufficient flexibility and accounting data for a number of applications. A more flexible approach that does not require software updates to any of the involved components is needed.

FIG. 1 is a simplified block diagram of a system 10 that communicates packets for an access terminal 20. According to the embodiment, system 10 includes a radio access network (RAN) 22, an Internet Protocol (IP) gateway (IPGW) 24, a communication network 26, a bearer manager 30, a policy server 40, an application manager 50, application servers 60, media servers 62, non-SIP applications 70, regulatory servers 80, PSTN gateway 82, security manager 90, and services data manager 92.

In accordance with the teachings of the present invention, application manager 50 in system 10 is operable to not only invoke an application server 60 when a service point trigger (SPT) is matched, but to also specify what accounting data to capture for that particular application server invocation. The accounting data can be taken from the SIP message itself, Rf AVP's, or the underlying system.

Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of application manager 50 in the context of communications system 10 and, accordingly, they should be construed as such.

It should be noted that the internal structure of the system of FIG. 2 below is versatile and can be readily changed, modified, rearranged, or reconfigured in order to achieve its intended operations or additional operations. Additionally, any of the items within FIGS. 1 and 2 may be combined, where appropriate, or replaced with other functional elements that are operable to achieve any of the operations described herein.

System 10 offers several advantages by capturing accounting data with an element (such as the application manager) other than application servers 60. Application servers 60 do not need to generate their own accounting feed if the application servers 60 are only invoked without having to capture the accounting data as described in the present invention. As a result, the development and deployment of application servers 60 are simplified since there is no need to support a new accounting feed from a new element. Instead, additional accounting data can be provided by an existing element that has already been tested, such as the application manager 50.

System 10 also offers other advantages of simplifying backend billing processing by having all accounting data associated with a session (such as a SIP session) being included in the same Rf accounting session. In the old scheme, when the application server 60 provided the accounting data, the backend billing system has to not only look for these additional records that create additional processing, but the billing system also has to be updated to look for those records when new application servers 60 are introduced. Since different users may invoke different services, this can be very complex. By having all accounting data for the session provided as part of a single Rf accounting session (such as start, interim, stop) provided by the Application Manager, then the backend processing is simplified significantly. Details relating to these operations are explained below in FIG. 2 and FIG. 3.

According to the illustrated embodiment, system 10 provides services such as communication sessions to endpoints such as access terminal 20. A communication session refers to an active communication between endpoints. Information may be communicated during a communication session. Information may include voice, data, text, audio, video, multimedia, control, signaling, and/or other information. Information may be communicated in packets, each comprising a bundle of data organized in a specific way for transmission.

System 10 may utilize communication protocols and technologies to provide communication sessions. Examples of communication protocols and technologies include those set by the Institute of Electrical and Electronics Engineers, Inc. (IEEE) standards, the International Telecommunications Union (ITU-T) standards, the European Telecommunications Standards Institute (ETSI) standards, the Internet Engineering Task Force (IETF) standards (for example, IP such as mobile IP), or other standards.

According to the illustrated embodiment, access terminal 20 represents any suitable device operable to communicate with a communication network. For example, a subscriber may use access terminal 20 to communicate with a communication network. Access terminal 20 may comprise, for example, a personal digital assistant, a computer such as a laptop, a cellular telephone, a mobile handset, and/or any other device operable to communicate with system 10. Access terminal 20 may be a mobile or fixed device.

System 10 includes a communication network 26. In general, communication network 26 may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication links, or any combination of any of the preceding.

Radio access network 22 provides access services to access terminals 20. For example, radio access network 22 may provide Layer 2 mobile access, mobility, and/or handoff services within its area of coverage. Alternatively, access terminals 20 can also access the network through alternative mechanisms, such as WiFi or 1xRTT data.

IP gateway 24 operates as a gateway between radio access network 22 and communication network 26. IP gateway 24 may perform operations such as authenticating access terminal 20, assigning a bearer manager 30 to access terminal 20, performing handoff functions between different IP gateways 24, IP gateway 24 and radio access network 22, and/or facilitating registration of access terminal 20 to communication network 26. Because IP gateway 24 performs such functions as authentication, handoff and context transfer in ways that are not access network specific, system 10 allows for roaming and handoff functions seamlessly across these different access network technologies.

Bearer manager 30 provides bearer paths that communicate packets to and/or from access terminal 20.

According to one embodiment, a bearer manager 30 operates as an anchor for a bearer path. Bearer manager 30 may operate as a home or foreign agent that authorizes use of a network address that allows access terminal 20 to use the bearer path anchored by bearer manager 30. Because of its role as the IP anchor point, bearer manager 30 can also act as the natural enforcement point for several network policies, such as quality of service, accounting, and mobility.

Bearer manager 30 may perform other suitable operations to provide services to access terminal 20.

Examples of other suitable operations include processing signaling, committing resources, and maintaining gateways for access terminal 20. A bearer manager 30 may comprise any suitable device, for example, a Serving General Packet Radio Services (GPRS) Support Node (SGSN), a Gateway GPRS Support Node (GGSN), a home/foreign agent, a mobile gateway, a mobile IPv4 node, a mobile IPv6 node, or a Packet Data Serving Node (PDSN). A bearer manager 30 may use any suitable protocol, for example, an IP Multimedia Subsystem (IMS) protocol.

Policy server 40 manages policies. Policy server 40 is responsible for implementing the policies that govern how the underlying IP network (such as IP gateway 24, bearer manager 30, and radio access network 22) is utilized in support of the applications (such as SIP and non-SIP applications) that run on top of the network. Policy server 40 controls bearer manager 30 and IP gateway 24 by providing it with policies, called facets, which bearer manager 30 and IP gateway 24 execute. Policy server 40 is contacted by numerous elements in the network for decisions on how they should proceed, such as situations where such decisions impact the underlying use of the IP network. A policy may include one or more policy rules, where a policy rule specifies an action to be taken if one or more conditions are satisfied. A policy may include facets, which are policy rules that may be installed and executed on a network element. A facet may allow a network element to make policy decisions. Policy server 40 may be coupled with bearer manager 30.

Application manager 50 manages applications, such as SIP applications and/or other suitable applications. Application manager 50 can perform SIP operations (such as SIP registration, authorization, and routing), voice features (such as call routing and call forwarding), Service Capabilities Interaction Management (SCIM), user presence services, and/or other operations. Application manager 50 is responsible for invoking SIP-based application servers 60, which can provide services like IP centrex and Push-To-Talk. Application manager 50 may communicate with policy server 40 to request a policy to be implemented on its behalf for a particular access terminal 20. Application manager 50 can also inform policy server of SIP session requests so that network can be properly configured to support these sessions.

System 10 supports two different types of applications: SIP-based applications and non-SIP applications. SIP-based application servers 60 reside on top of application manager 50, and application servers 60 are accessed using the IMS Service Control (ISC) interface. SIP-based application servers 60 can provide services like IP centrex and Push-To-Talk. However, access to these applications and coordination of underlying network resources in support of SIP applications is managed by policy server 40, which communicates with application manager 50.

System 10 also supports non-SIP applications. Non-SIP application servers 70 can be invoked directly by access terminal 20 or through other triggers.

Communication interface between the non-SIP application servers 70 and policy server 40 is identical to the communication between application manager 50 and policy server 40. This communication interface can be based on DIAMETER or any other suitable interface.

Media servers 62 represent coarse grained application components that are not useful applications by themselves, but are useful when used by other applications. Application servers 60 may need access to media processing functions (such as Interactive Voice Response), mixing functions, and messaging functions. Rather than have each application server 60 implement these functions separately, the functions are extracted into a common set of media servers 62. Media servers 62 are also known as service enablers.

Regulatory server 80 provides an interface for installation of intercept orders from law enforcement agencies, and the collection of data from the network for delivery to law enforcement agencies. System 10 is operable to interconnect with the PSTN through traditional SIP-based PSTN gateways 82.

Security manager 90 is the central access point for security services in system 10. Authentication at all layers takes place through interactions with security manager 90 since security manager 90 acts as the central repository and generation point for keying materials. Security manager 90 is the core of the Security Operations Center (SOC), which provides continuous management of threats in system 10.

Services data manager (SDM) 92 stores subscriber data for access terminals 20. Components needing access to subscriber data, including application manager 50, policy server 40, SIP application servers 60, and non-SIP application servers 70, obtain subscriber data from SDM 92. Since numerous protocols and devices are used in system 10, each with potentially different identifiers, SDM 92 acts as the repository for the subscriber data.

SDM 92 is operable to relate various identifiers used within system 10. SDM 92 provides basic Create/Read/Update/Delete (CRUD) services on the subscriber data, and SDM 92 stores subscriber data. SDM 92 also serves as the repository of accounting records for subscriber use in system 10. Accounting records are read by back-end billing systems for correlation and billing. SDM 92 also stores various pieces of non-subscriber data, such as PSTN routing logic. Provisioning systems can interface with SDM 92 by pushing subscriber data into SDM 92 and reading it out.

A component of system 10 may include any suitable arrangement of elements, for example, an interface, logic, memory, other suitable element, or combination of any of the preceding. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Figure 2:
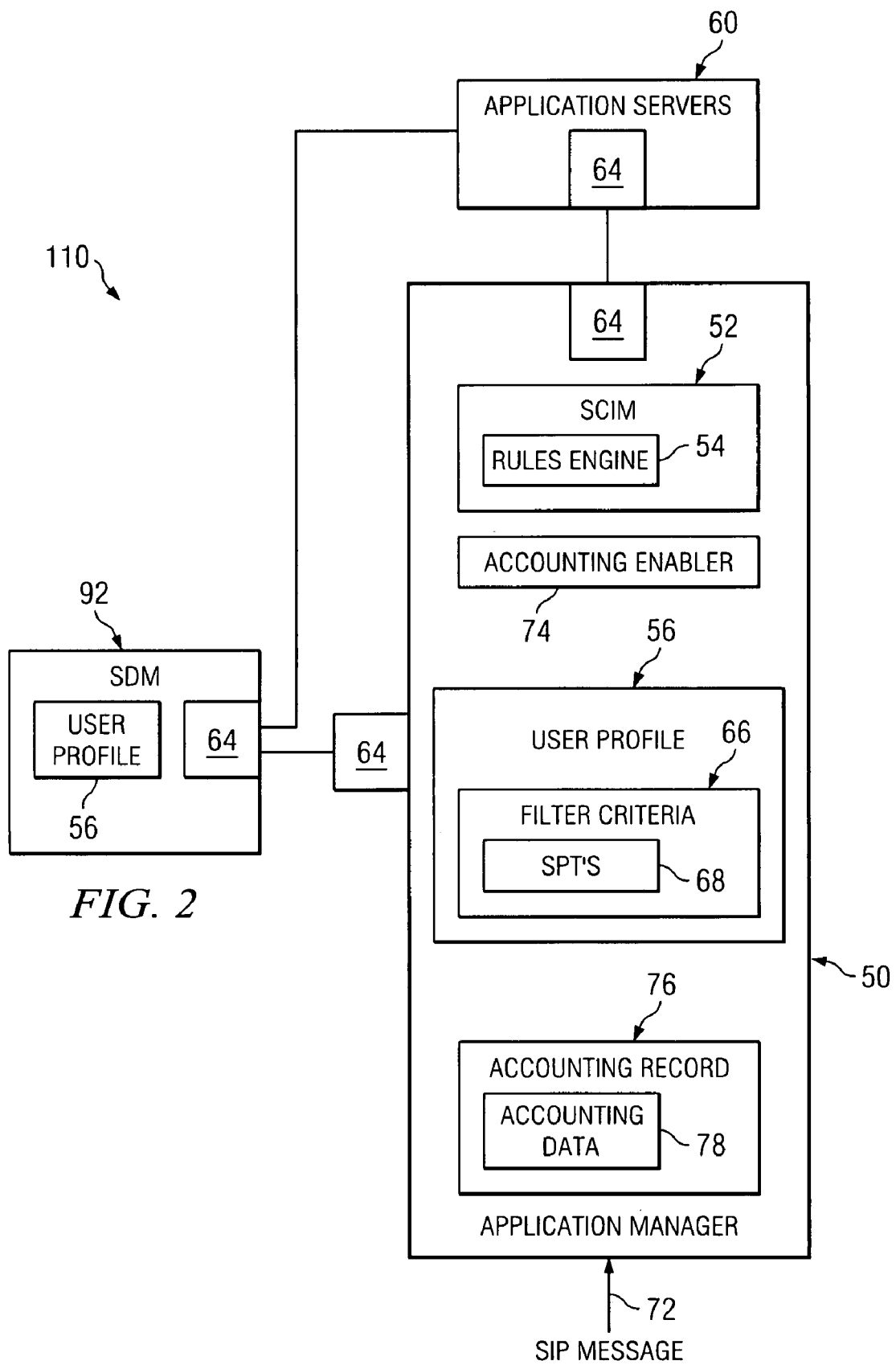
FIG. 2 is a simplified block diagram that illustrates an accounting model in accordance with an embodiment of the present invention.

FIG. 2 illustrates an example of an accounting model 110 that may be used with system 10 of FIG. 1. In one embodiment, accounting model 110 includes application manager 50, application servers 60, and SDM 92. In this particular embodiment, application manager 50 includes Services Capability Interaction Manager (SCIM) 52, user profile 56, an accounting enabler, an accounting record, and an interface 64. SCIM 52 includes a rules engine 54. User profile 56 includes filter criteria 66, which includes one or more service point triggers (SPT's) 68.

SCIM 52 is one of the core components of application manager 50. SCIM 52 maintains SIP dialog state, which enables SCIM 52 to perform dialog stateful feature processing, such as allowing two simultaneous calls to a particular user or access terminal 20. SCIM 52 knows that there is a dialog and SCIM 52 knows various state information associated with the dialog, such as the dialog ID, dialog state, dialog duration, etc. SCIM 52 also associates tokens with the dialog that identifies the type of dialog (e.g., "ptt"), features invoked (e.g., "CFNA"), bearer interactions, ("audio", "video", etc.) and any other type of information that may be of importance to its processing later on. SCIM 52 avoids hard-coding of features and other capabilities inside application manager 50 by using rules engine 54 with high-level scripts provided in external documents and filter criteria 66 provided in subscriber profiles 56. SCIM 52 is operable to be programmed with processing logic involving network enablers, feature invocations, feature interaction, and feature invocation aware logic based on tokens.

Rules engine 54 is used by SCIM 52 to produce tokens. Rules engine 54 performs regular expression matching on a given textual input, e.g. a SIP message. As a result, rules engine 54 may produce a textual output, e.g. one or more tokens such as "ptt". Operation of rules engine can be governed by a script using a high-level scripting language. Scripts are provided via an external document. Rules engine 54 can use one of these scripts to process the input provided after rules engine 54 is invoked. Operation of the SCIM 52 itself can be governed by these tokens via filter criteria 66. Furthermore, SCIM 52 provides these tokens as input to the policy function, which in turn may provide a modified set of tokens back to SCIM 52.

SIP user profiles 56 are stored in SDM 92 and retrieved by application manager 50 when the user registers or a request to the unregistered user arrives at his assigned application manager 50. The user profile 56 is cached by the application manager 50 and the SDM 62 notifies it of any changes made to user profile 56. SIP services are managed by SCIM 52, which examines user profile 56 in order to determine which application servers 60 to invoke when a request or response is received. SIP users have a SIP user profile 56 associated with them. The SIP user profile 56 is associated with a private user identity and contains one or more service profiles, each of which contains filter criteria 66.

Filter criteria 66 determine which application servers 60 to invoke. Filter criteria 66 contains a set of trigger points which, when matched, can result in the invocation of one or more SIP application servers 60. Application servers 60 are contacted via SIP. Filter criteria 66 can also result in interactions with network enablers.

Filter criteria 66 contain a set of service point triggers (SPT's) 68 each of which is associated with a particular application server 60 to be invoked if SPT 68 matches. In this embodiment, filter criteria 66 can invoke a particular application server 60 when an SPT 68 is matched, and filter criteria 66 can also specify the accounting information 78 to be captured in accounting record 76 during the application session.

SPT's 68 can examine the contents of the SIP message 72 and other data as well. Filter criteria 66, which determine how to handle both SIP requests and responses based on a variety of matching criteria, including, but not limited to following SPT's 68: SIP message content (such as Request-URI, Request-URI properties, SIP method, SIP response code, Header content, Body content); activation status of an application provisioned in the SDM (e.g. CFB active or not); set of applications invoked for other sessions to or from the user (maintained by SCIM); subscriber data, both provisioned (e.g. buddy list) and dynamic (e.g. presence data), using an arbitrary schema format; interactions with network enablers; interactions with the policy function. SPT's provide for a high degree of programmable logic in application manager, which enables application manager 50 to meet the general service factory requirements without requiring either constant software upgrades or pushing the service factory problem into application server 60. Application manager 50 can provide service logic and accounting data 78 in a flexible manner by using SPT's 68.

In this particular embodiment, interface 64 is a DIAMETER Rf interface. The Rf protocol allows an IMS Charging Trigger Function (CTF) to issue offline charging events to a Charging Data Function (CDF). The charging events can either be one-time events or may be session-based. The START, INTERIM, and STOP event types are used for session-based accounting. The EVENT type is used for event based accounting, or to indicate a failed attempt to establish a session. START event type starts an accounting session. INTERIM event type updates an accounting session. STOP event type stops an accounting session. Offline charging is used for network services that are paid for periodically. For example, a user may have a subscription for voice calls that is paid monthly.

Accounting enabler 74 provides for general accounting support in application manager 50. Accounting enabler 74 is operable to generate accounting events. Additionally, accounting enabler 74 is operable to generate accounting events for applications by allowing trigger points to generate accounting events, such as when a particular application server 60 is invoked by application manager 50. Accounting enabler 74 can capture accounting data 78 before or after application manager 50 invokes application server 60. Application server 60 may send accounting information 78 that accounting enabler 74 records in the accounting session. Accounting enabler 74 is operable to capture accounting data 78 before and after invoking application server 60. Accounting enabler 74 is operable to consolidate one or more accounting records 76 and accounting data 78 associated with a particular session. Accounting enabler 74 supports off-line charging.

Accounting records 76 are generated by accounting enabler 74, and represent details of the operation of application manager 50 and/or of each application server 60 providing a specific application. Accounting records 76 are sent to SDM 92 at one or more of the beginning, middle, and end of an application session. In the case of SIP, this could mean the end of a call. Accounting records 76 may also be sent to SDM 92 as a result of other events, e.g. registration.

Accounting information 78 that application manager 50 can specify to capture includes, but is not limited to: i) value of SIP method; ii) value of the Request-URI; iii) value of any SIP header included in the SIP message, such as the identity of the user that is placing the incoming call is included in the header; iv) value of message body, such that charging is based on type of session and media streams associated with that session, such as SDP; v) any attribute value pairs defined in existing Rf interface defined by IMS; vi) date and time of day; vii) value of SPT that triggered particular accounting event; and viii) token values, such as text strings.

Figure 3:
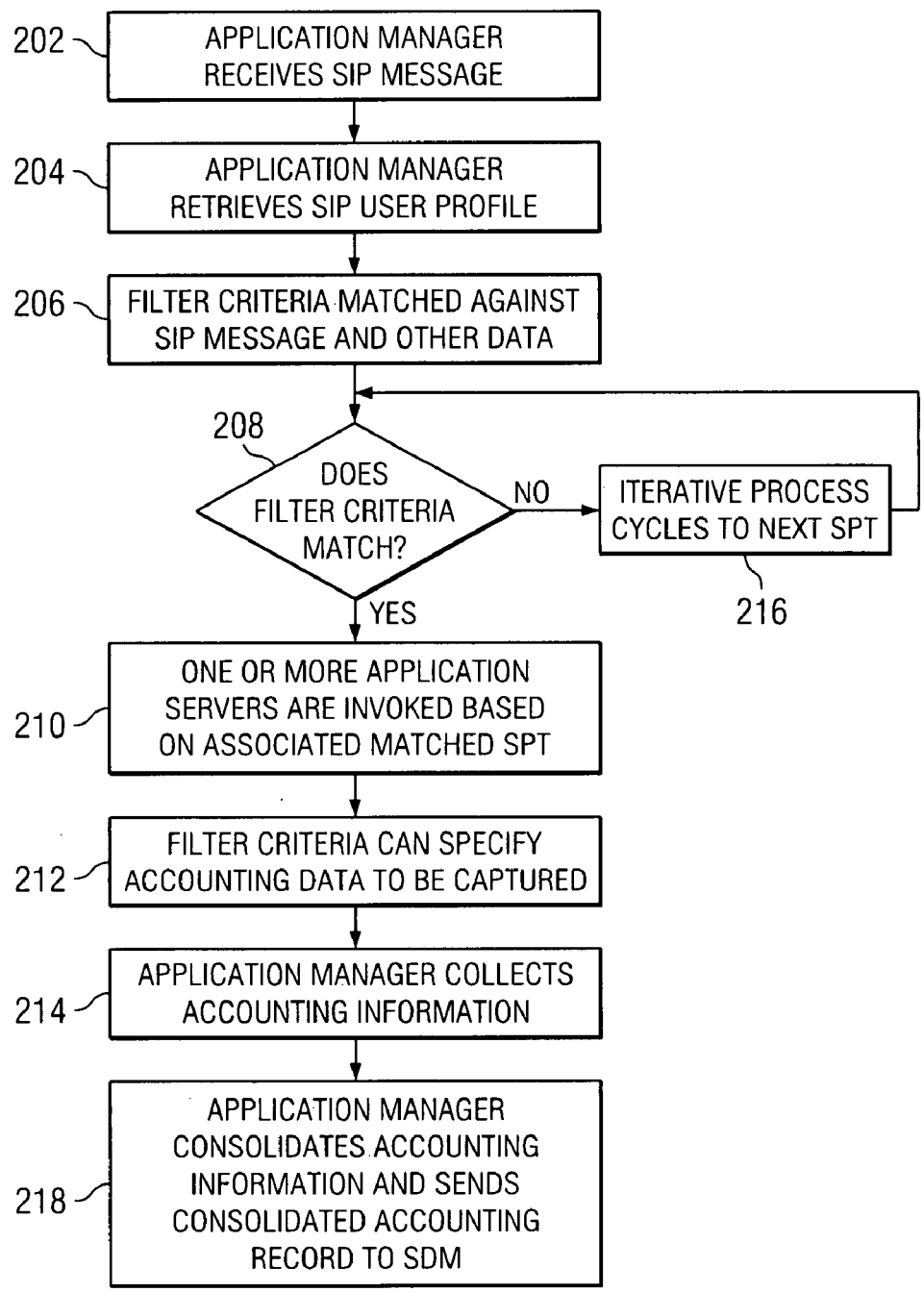
FIG. 3 is a simplified flowchart that illustrates an example method of creating an accounting record in accordance with an embodiment of the present invention.

FIG. 3 is a simplified flowchart that illustrates an example method of creating accounting record 76 in accordance with an embodiment of the present invention. The example process begins at step 202 where application manager 50 receives SIP message 72. At step 204, application manager 50 retrieves SIP user profile 56 that includes filter criteria 66 associated with SIP message 72. Filter criteria 66 contain a set of service point triggers (SPT's) 68 each of which is associated with a particular application server 60 to be invoked if SPT 68 matches. At step 206, application manager 50 runs matching operation of filter criteria 66 against SIP message 72 that is coming in. At step 208, application manager 50 determines if filter criteria 66 matches.

If SPT 68 is matched, application manager 50 can invoke one or more application servers 60 at step 210. One or more SPT's 68 can invoke on or more application servers 60 for every match until list of filter criteria is exhausted as shown in step 216 below. At step 212, filter criteria 66 can also specify accounting information 78 to be captured in accounting record 76 during the application session. Filter criteria 66 can specify if accounting data 78 should be captured before invoking application server 60, after invoking of application server 60, or both before and after invoking application server 60. This enables system 10 to introduce new SIP services with new SIP application servers 60 without any changes to the accounting interfaces or the need for correlation of new accounting records 76 by back-end systems. Alternatively, filter criteria 66 can specify accounting information 78 to be captured before invoking application server 60.

At step 214, a session is setup and application manager 50 collects accounting events for that session. Application manager 50 generates accounting records 78. Any mid-session changes will cause additional accounting events to be created. Eventually the session ends, such as when a SIP call is terminated. Application manager 50 is operable to collect accounting events before invoking application server 60, after invoking application server 60, and both. For example, in Rf accounting a DIAMETER session starts with various interim events and stops. This can be consolidated into a a single event, which is more efficient for backend processor. Alternatively, multiple events, each containing the relevant application server accounting data can be generated.

At step 216, an iterative process can cycle through entire list of SPT's 68. After the last SPT 68 is processed, application manager 50 is finished capturing accounting data 78 for this message. At step 218, application manager 50 sends a consolidated accounting record 76 to SDM 92. Consolidating accounting records 76 reduces the overall number of accounting events that have to be sent through system 10.

It is important to note that the stages and steps described above illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing compatibility functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, RAN 22 illustrated by FIG. 1 may be supplanted by Wi-Fi or any other suitable access networks that are conducive to network communications. In addition, while the foregoing discussion has focused on SIP, any other suitable session protocol may benefit from the compatibility teachings provided herein. The present invention is not confined to the SIP platform or to the identified signaling protocols.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for creating an accounting record in a communication network, comprising:
    receiving a SIP message;
    retrieving, by an application manager, a user profile, the user profile comprising one or more filter criteria, the filter criteria comprising one or more service point triggers, the one or more service point triggers identifying an application server to be invoked and accounting information to be captured during a communication session with the application server;
    matching the one or more service point triggers with data associated with the SIP message;
    invoking a communication session with an application server identified by the service point trigger matched;

determining the accounting information to be captured during the communication session as identified by the service point trigger; and capturing during the communication session, at the application manager, the accounting information identified by the service point trigger matched.

2. The method of claim 1 further comprising consolidating the accounting information into the accounting record.

3. The method of claim 1, further comprising sending the accounting record to a services data manager.

4. The method of claim 1, wherein data comprises contents of the SIP message.

5. The method of claim 1, wherein the application server is one of a plurality of application servers.

6. The method of claim 1, the accounting information being a selected value of a group of accounting information, the group consisting of:
   a) value of a SIP method;
   b) value of a request-URI;
   c) value of a SIP header in the SIP message;
   d) value of a SIP message body in the SIP message;
   e) attribute value pairs;
   f) date;
   g) time of day;
   h) value of a token; and
   i) value of the service point trigger matched.

7. A system for creating an accounting record in a communication network, comprising:
   an application server; and
   an application manager operable to:
      receive a SIP message;
      retrieve a user profile, the user profile comprising one or more filter criteria, the filter criteria comprising one or more service point triggers, the one or more service point triggers identifying an application server to be invoked and accounting information to be captured during a communication session with the application server;
      match the one or more service point triggers with data associated with the SIP message;
      invoke a communication session with the application server identified by the service point trigger matched;
      determine the accounting information to be captured during the communication session as identified by the service point trigger; and
      capture, during the communication session, the accounting information identified by the service point trigger matched.

8. The system of claim 7, wherein the application manager is further operable to consolidate the accounting information into the accounting record.

9. The system of claim 7, wherein the application manager is further operable to send the accounting record to a services data manager.

10. The system of claim 7, wherein data comprises contents of the SIP message.

11. The system of claim 7, wherein the application server is one of a plurality of application servers.

12. The system of claim 7, the accounting information being a selected value of a group of accounting information, the group consisting of:
   a) value of a SIP method;
   b) value of a request-URI;
   c) value of a SIP header in the SIP message;
   d) value of a SIP message body in the SIP message;
   e) attribute value pairs;
   f) date;
   g) time of day;
   h) value of a token; and
   i) value of the service point trigger matched.

13. Logic embodied in a computer readable medium, the computer readable medium comprising code such that when executed is operable to:
   receive a SIP message;
   retrieve, by an application manager, a user profile, the user profile comprising one or more filter criteria, the filter criteria comprising one or more service point triggers, the one or more service point triggers identifying an application server to be invoked and accounting information to be captured during a communication session with the application server;
   match the one or more service point triggers with data associated with the SIP message;
   invoke a communication session with an application server identified by the service point trigger matched;
   determine the accounting information to be captured during the communication session as identified by the service point trigger; and
   capture during the communication session, at the application manager, the accounting information identified by the service point trigger matched.

14. The medium of claim 13, wherein the medium is further operable to consolidate the accounting information into the accounting record.

15. The medium of claim 13, wherein the medium is further operable to send the accounting record to a services data manager.

16. The medium of claim 13, wherein data comprises contents of the SIP message.

17. The medium of claim 13, wherein the application server is one of a plurality of application servers.

18. The medium of claim 13, the accounting information being a selected value of a group of accounting information, the group consisting of:
   a) value of a SIP method;
   b) value of a request-URI;
   c) value of a SIP header in the SIP message;
   d) value of a SIP message body in the SIP message;
   e) attribute value pairs;
   f) date;
   g) time of day;
   h) value of a token; and
   i) value of the service point trigger matched.

19. The medium of claim 13, wherein the service point trigger matched is one of a plurality of service point triggers matched.

20. A system for creating an accounting record in a communication network, comprising:
   means for receiving a SIP message;
   means for retrieving, by an application manager, a user profile, the user profile comprising one or more filter criteria, the filter criteria comprising one or more service point triggers, the one or more service point triggers identifying an application server to be invoked and accounting information to be captured during a communication session with the application server;
   means for matching the one or more service point triggers with data associated with the SIP message;
   means for invoking a communication session with an application server identified by the service point trigger matched;
   means for determining the accounting information to be captured during the communication session as identified by the service point trigger; and
   means for capturing during the communication session, at the application manager, the accounting information identified by the service point trigger matched.

* * * * *